United States Patent
Volpin et al.

(10) Patent No.: US 10,630,008 B2
(45) Date of Patent: Apr. 21, 2020

(54) ELECTRIC CONNECTING STRUCTURE AND MANUFACTURING METHOD THEREOF

(71) Applicant: Johnson Electric S.A., Murten (CH)

(72) Inventors: Davide Volpin, Asti (IT); Donato Montesano, Asti (IT)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/997,599

(22) Filed: Jun. 4, 2018

(65) Prior Publication Data

US 2018/0351273 A1 Dec. 6, 2018

(30) Foreign Application Priority Data

Jun. 5, 2017 (IT) .......................... 102017000060764

(51) Int. Cl.
| | |
|---|---|
| H01R 12/59 | (2011.01) |
| H01R 43/24 | (2006.01) |
| H01R 13/405 | (2006.01) |
| H01R 13/719 | (2011.01) |
| B29C 45/14 | (2006.01) |
| F01P 11/10 | (2006.01) |

(Continued)

(52) U.S. Cl.
CPC ..... *H01R 12/592* (2013.01); *B29C 45/14549* (2013.01); *F01P 11/10* (2013.01); *H01R 12/515* (2013.01); *H01R 13/405* (2013.01); *H01R 13/5837* (2013.01); *H01R 13/719* (2013.01); *H01R 43/24* (2013.01); *H02K 5/225* (2013.01); *B29C 2045/0037* (2013.01); *B29L 2031/7278* (2013.01); *F01P 2070/50* (2013.01); *H01R 13/6625* (2013.01); *H02K 9/06* (2013.01)

(58) Field of Classification Search
CPC .. H01R 12/515; H01R 12/592; H01R 13/405; H01R 13/719; H01R 13/5837; H01R 13/6625; H01R 43/24; H01R 13/66–7197; H01R 9/2425; H01R 9/2443; B29C 45/14549; B29C 2045/0037; B29L 2031/7278; F01P 11/10; F01P 2070/50; H02K 9/06
USPC .... 439/495, 620.08, 620.09, 620.13, 620.21; 363/146
See application file for complete search history.

(56) References Cited

U.S. PATENT DOCUMENTS 3,621,118 A * 11/1971 Bunish ..................... H01B 7/08
174/115
4,202,590 A * 5/1980 Hoffman .............. H01R 13/501
439/467

(Continued)

*Primary Examiner* — Travis S Chambers
(74) *Attorney, Agent, or Firm* — Millman IP Inc.

(57) ABSTRACT

An electric connecting structure is provided, which includes an outer casing, at least two electrical connection terminals, at least two cables, and an electronic component. At least part of each electrical connection terminal is fixed in the outer casing. Each of the at least two cables has an end connected to the corresponding electrical connection terminal. The electric connection structure further includes at least one cable holder molded onto the at least two cables and mounted in the outer casing. The electronic component is connected between the ends of the at least two cables. The electric connection structure can simplify the wiring operations and consequently reduce the time and costs required for the wiring operations.

20 Claims, 9 Drawing Sheets

(51) Int. Cl.
*H01R 12/51* (2011.01)
*H01R 13/58* (2006.01)
*H02K 5/22* (2006.01)
*H01R 13/66* (2006.01)
*B29L 31/00* (2006.01)
*B29C 45/00* (2006.01)
*H02K 9/06* (2006.01)

(56) References Cited

U.S. PATENT DOCUMENTS

| | | | | | |
|---|---|---|---|---|---|
| 4,208,645 | A | * | 6/1980 | Harmon | H01H 85/046 337/297 |
| 5,115,368 | A | * | 5/1992 | Smith | H01R 13/719 361/111 |
| 5,192,231 | A | * | 3/1993 | Dolin, Jr. | H01R 13/6625 361/111 |
| 5,266,055 | A | * | 11/1993 | Naito | H01R 13/719 333/181 |
| 5,984,729 | A | * | 11/1999 | Hollander | H01R 13/719 374/E7.005 |
| 7,575,438 | B2 | * | 8/2009 | Dilgard | H01R 13/6616 439/35 |
| 7,588,465 | B2 | * | 9/2009 | Habele | B25F 5/02 310/50 |
| 2005/0118874 | A1 | * | 6/2005 | Lin | H05K 9/0066 439/620.1 |
| 2012/0045927 | A1 | * | 2/2012 | Panko | H01R 13/6666 439/488 |
| 2014/0080329 | A1 | * | 3/2014 | Yamanaka | H05K 5/0069 439/76.1 |
| 2015/0118910 | A1 | * | 4/2015 | Luo | H01R 24/48 439/620.09 |
| 2015/0171567 | A1 | * | 6/2015 | Kawamoto | H01R 13/665 439/620.21 |
| 2016/0142030 | A1 | * | 5/2016 | Hamner | H03H 7/0115 174/70 R |

* cited by examiner

(PRIOR ART)

ELECTRIC CONNECTING STRUCTURE AND MANUFACTURING METHOD THEREOF

CROSS REFERENCE TO RELATED APPLICATIONS

This non-provisional patent application claims priority under 35 U.S.C. § 119(a) from Patent Application No. 102017000060764 filed in Italy on Jun. 5, 2017, the entire contents of which are hereby incorporated by reference.

FIELD OF THE INVENTION

This present disclosure relates to an electric connecting structure for transmitting a power source and/or a control signal for an electric device, particularly for an electric motor applied in a fan unit for a heat exchanger of an automobile, and a manufacturing method thereof.

BACKGROUND OF THE INVENTION

Figure 1:
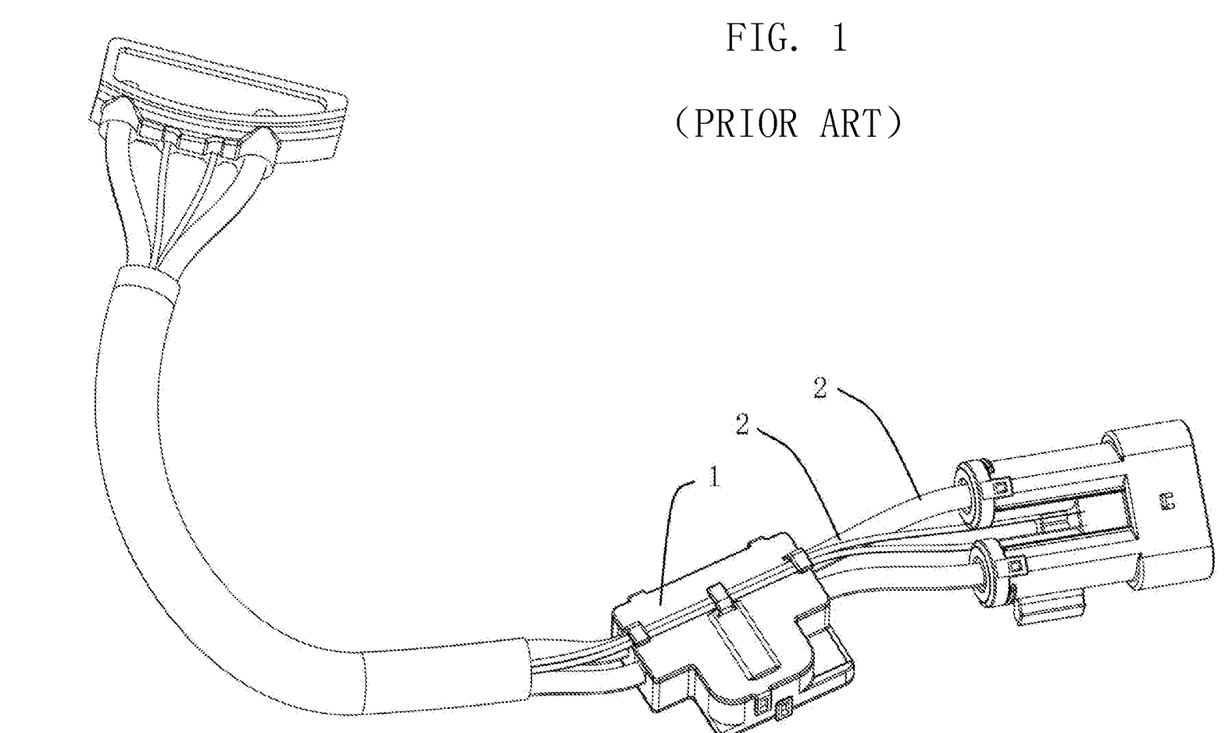
FIG. 1 illustrates an application of an electric connecting structure according to the prior art.
Figure 2:
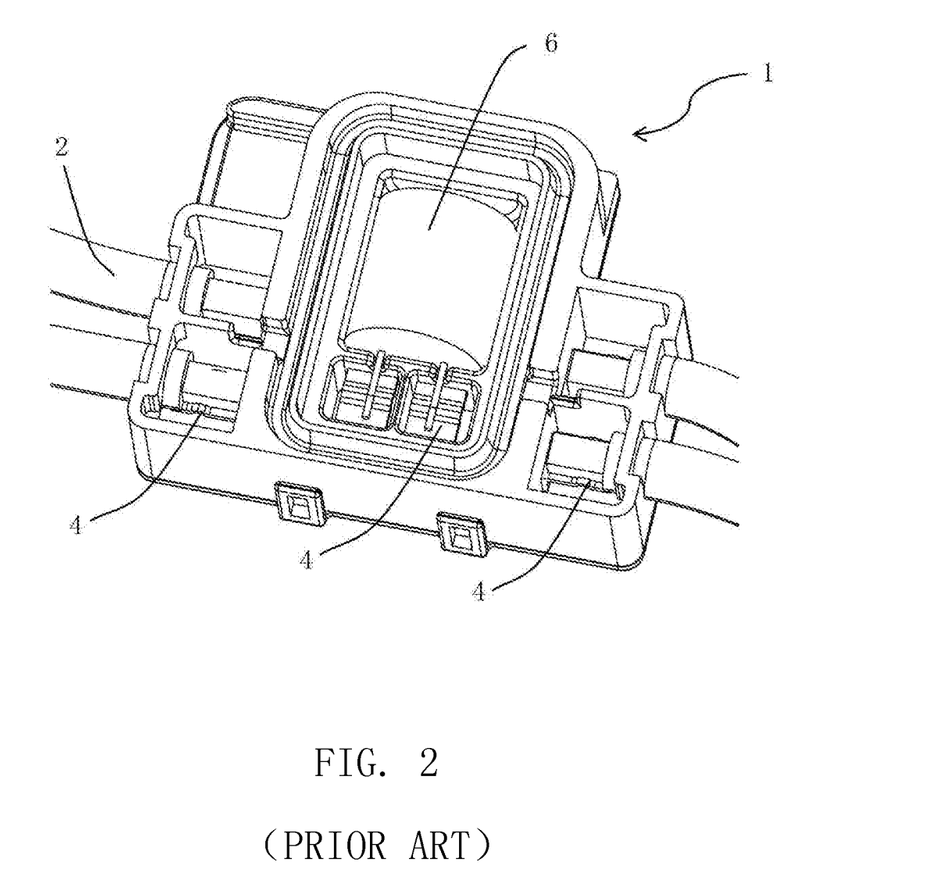
FIG. 2 illustrates the electric connecting structure of FIG. 1, with a lid thereof removed.

The electric connecting structure 1 of the prior art, for example, as illustrated in FIGS. 1 and 2, includes four cables 2, and an outer casing with two metal terminals 4 fixed therein, and an electrical component 6. The four cables 2 are respectively welded to four ends of the metal terminals 4. The electrical component 6 is connected between the two metal terminals 4.

The correct positioning of the cables 2 for welding to the corresponding metal terminals 4 is complex and difficult to automate. Once the positioning is not correct, the connection between the cables 2 and the metal terminals 4 would be unstable and even electric connecting structure 1 will not work normally.

SUMMARY

Thus, there a desire for an electric connecting structure, which can simplify the wiring operations and consequently reduce the time and costs required for the wiring operations. In particular, simplify the wiring operations of an electric connecting structure an electric motor, more particular for simplifying the wiring operations of a brushless motor coupled with a fan unit for a heat exchanger of an automobile.

According to one aspect, an electric connecting structure is provided, which includes an outer casing, at least two electrical connection terminals, at least two cables, and an electronic component. At least part of each electrical connection terminal is fixed in the outer casing. Each of the at least two cables has an end connected to corresponding electrical connection terminal. The electric connecting structure further includes at least one cable holder molded onto the at least two cables. The at least one cable holder is mounted in the outer casing, and the electronic component is connected between the ends of the at least two cables.

According to another aspect, a manufacturing method of an electric connecting structure is provided, which includes:
providing at least two cables, each of which having an end;
forming at least one cable holder integral with the at least two cables by injection molding; and
connecting an electronic component between the ends of the at least two cables, mounting the at least one cable holder into an outer casing with at least two electrical connection terminals fixed therein, and connecting the ends of the at least two cables and corresponding electrical connection terminals.

According to another aspect, an electric connecting structure is provided, which includes an outer casing including two opposite sides, at least two cables including two power cables, and an electronic component arranged inside the outer casing. The electric connecting structure further includes at least one cable holder at least molded onto the two power cables and mounted in the outer casing. Each of the two power cables passes through the two opposite sides in turn. The electronic component is connected between the two power cables.

In the embodiments of the present disclosure, the electric connecting structure need not to respectively position the cables and the electrical connection terminals, and thus simplify the wiring operations and consequently reduce the time and costs required for the wiring operations.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the invention.

Figure 3:
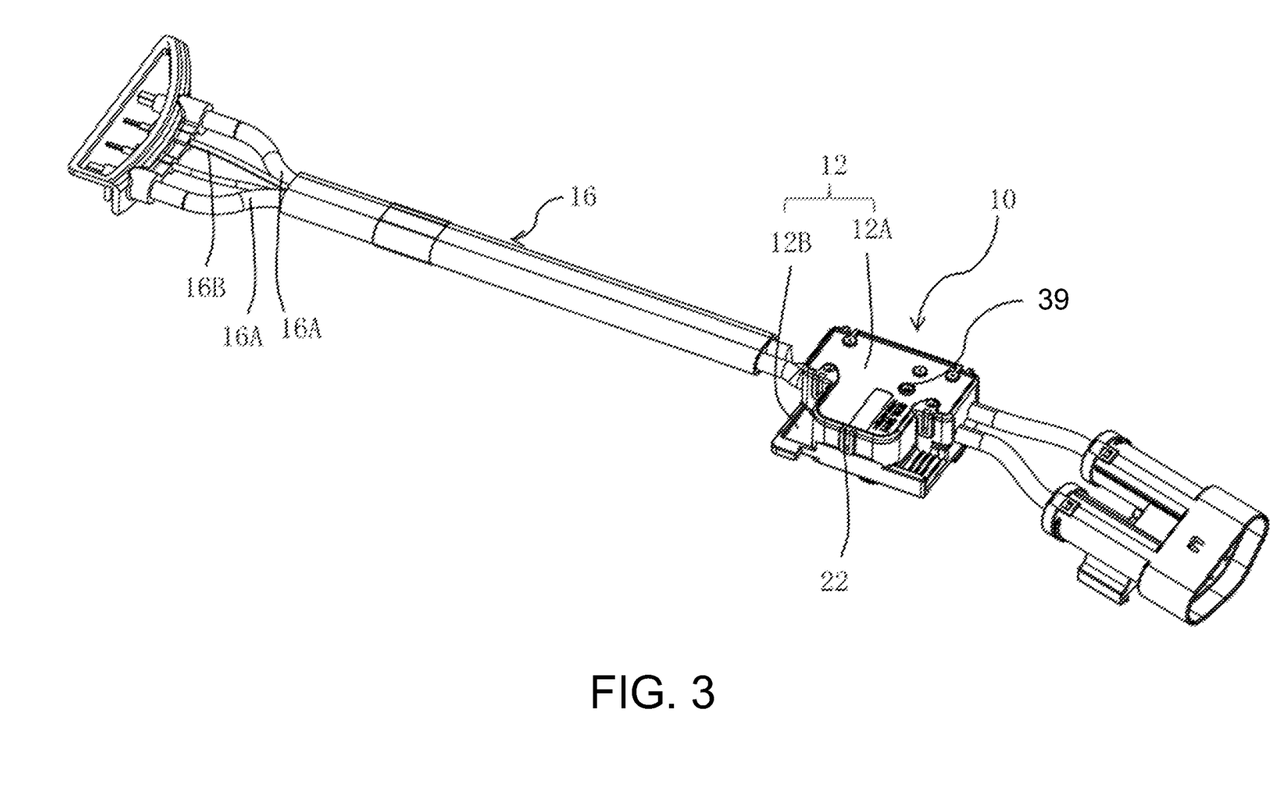
FIG. 3 illustrates an application of an electric connecting structure according to a first embodiment of the present disclosure.
Figure 4:
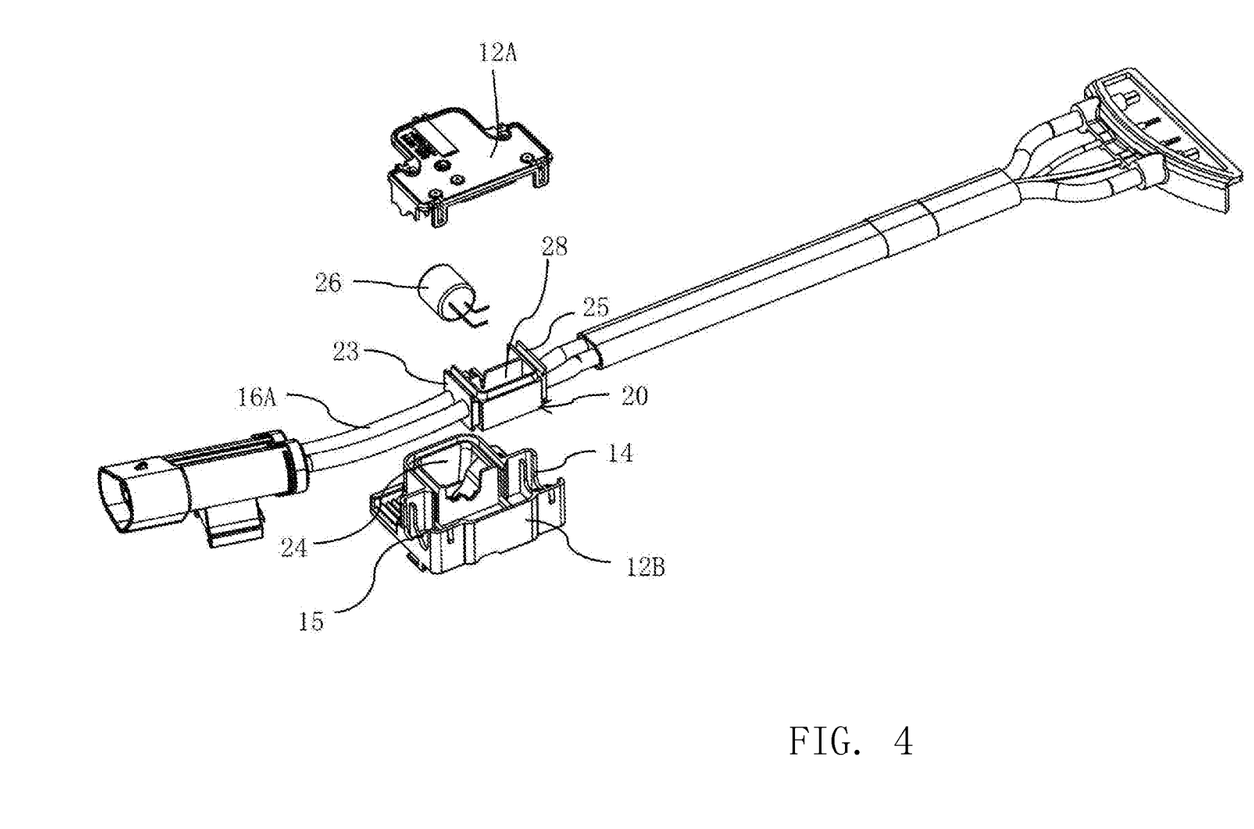
FIG. 4 is a partially exploded view of FIG. 3.

FIGS. 3 to 4 illustrate an electric connecting structure according 10 to a first embodiment of the present disclosure. The electric connecting structure 10 is an electromagnetic shielding box with at least two cables 16, for shielding electromagnetic interference. The cables 16 are configured for transmitting a power source and/or a control signal. The electric connecting structure 10 can be used in various applications, such as be connected to an electrical device (not shown). The electrical device may be an electric motor, in particular a brushless motor applied in a fan unit for a heat exchanger of an automobile.

In the illustrated embodiment, the at least two cables 16 includes two power cables 16A for transmitting power source, and two signal cables 16B for transmitting a control signal. It should be understood that the number of the signal cables 16B also can be only one or more than two.

The electric connecting structure 10 includes a cable holder 20 integral with the power cables 16A, an outer casing 12 with two opposite sides, and at least one electronic component 26. The first side of the outer casing 12 includes a first opening 14 provided for an access of the power cables 16A. The second side of the outer casing 12 includes a second opening 15 provided for an exit of the power cables 16A. The power cables 16A pass through the first opening 14 and the second opening 15 in turn.

The cable holder 20 is molded onto the power cables 16A. Preferably, the cable holder 20 is designed as an injection-molded component and directly molded on the two power cables 16A with a plastic material, so that the power cables 16A are held by the cable holder 20 to prevent the cable holder 20 from moving along the power cables 16A. The signal cables 16B are fixed to the outside of the outer casing 12. In alternative embodiments, the cable holder 20 also can be molded onto all the cables 16, and thus all the cables 16 pass through the first opening 14 and the second opening 15 in turn.

Figure 5:
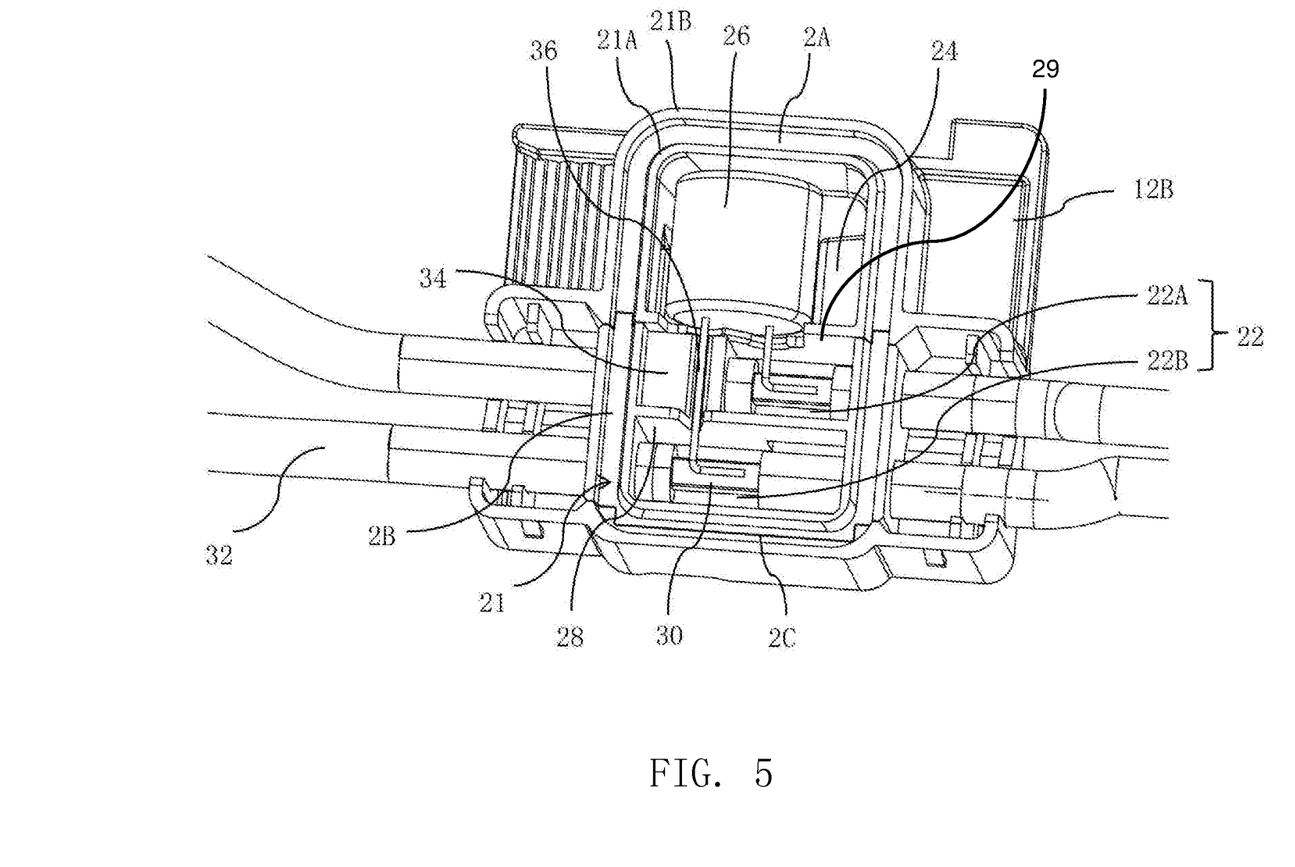
FIG. 5 illustrates the electric connecting structure of FIG. 3, with a lid thereof removed.

The cable holder 20 is arranged in the outer casing 12. The coupling operation between the cable holder 20 and the outer casing 12 can be carried out after the molded material of the cable holder 20 is solidified. The cable holder 20 may be mounted and positioned in the outer casing 12 through sliding or interlocking. The electronic component 26 may be a filter element, preferably a capacitor. The electronic component 26 is connected between the two power cables 16A held by the cable holder 20. The electrical connection between the electronic component 26 and the power cable 16A is preferably, but not limited to electric resistance welding, also can use other known methods such as seaming, brazing or soft-soldering.

Preferably, the cable holder 20 is substantially a rectangular frame. The power cables 16A cross the cable holder 20 from a first side 23 to a second side 25. The cable holder 20 includes a slot 22 to house a portion of the power cables 16A. The slot 22 is open to allow an operation from the outside to the portion of the power cables 16A. That is, the portion of the power cables 16 located in the slot 22 is exposed, so the operator can easily operate on the two power cables 16A to establish corresponding electrical connections. The slot 22 may be partitioned into two sub-slots 22A, 22B by a partition wall 28, each of which houses a portion of one power cable 16A.

In the illustrated embodiment, each of the power cables 16A includes a conductor 30 and a sheath 32. The electronic component 26 has two pins 36, each of which is connected to the corresponding power cable 16A through removing a part of the sheath 32, without cutting off the conductor 30. The pin 36 of the electronic component 26 is connected to the part of conductor 30 uncovered by the sheath 32, preferably through an electric resistance welding. As such, the correct positioning in the prior art is unnecessary, the electric connecting structure 10 is capable of simplifying the wiring operations and consequently reduce the time and costs required for the wiring operations.

Preferably, the conductor 30 includes a plurality of compacted copper wires with a rectangular cross-section. The slot 22 is a through opening, which passes through the cable holder 20 along a direction perpendicular to an extension direction of the power cables 16A, so that both sides of the portion of the two power cables 16A housed in the cable holder 20 are operatable, which is convenient for electric resistance welding the electronic component 26 to the two power cables 16A.

In the illustrated embodiment, the outer casing 12 includes a lid 12A and a main body 12B coupled together through an interlocking closure structure (not labelled). Alternative closure structure also can be used, such as a screwing closure structure. The outer casing 12, in particular the main body 12B thereof includes a chamber 24 to accommodate the electrical component 26. Preferably, the chamber 24 and the slot 22 of the cable holder 20 are partitioned by a partition wall 29. The lid 12A may further include an injection hole 39 corresponding to the slot 22 for injection resin to seal the slot 22.

Preferably, the bottom of the chamber 24 of the main body 12B further includes a pressure equalization valve (not shown) to compensate the pressure variation of the chamber 24 accommodating the electrical component 26. The pressure equalization valve includes at least one breathing hole (not shown), from which the external air can enter or exit, and a water-impermeable membrane (not shown). The membrane is a microporous membrane, e.g. one made of polytetrafluoroethylene, such as a Gore-Tex™ membrane, which is permeable to air but watertight. The breathing hole may be integrally formed in the bottom of the chamber 24, or formed in a separate element which is assembled to the bottom of the chamber 24. The membrane is fixed, preferably welded to the bottom of the chamber 24 and corresponding to the breathing hole. In alternative embodiment, the pressure equalization valve also can be arranged in the lid 12A.

Preferably, the cable holder 20 further includes at least one guide portion 34 arranged to guide one pin 36 of the electrical component 26, in order to avoid any possible damages to the pin 36 or short-circuit between the pins 36.

Preferably, a closed-loop groove 21 is formed on the side of the assembled main body 12B and the cable holder 20 adjacent to the lid 12A. The closed-loop groove 21 is a continuous groove surrounding the electronic component 26 and an electrical connection area of the electronic component 26 and the cables 16, for dispensing resin. Preferably, the closed-loop groove 21 includes an inner boundary wall 21A and an outer boundary wall 21B to close the groove 21.

The lid 12A further includes a closed-loop projection (not shown) to be inserted into the closed-loop groove 21, so as to realize a reliable sealing of the electric connecting structure 10 in an assembled condition. In alternative embodiments, the closed-loop groove 21 also may be formed in the lid 12A, correspondingly, the closed-loop projection may be formed on the at least one of the main body 12B and the cable holder 20. The closed-loop groove 21 is preferably rectangular, also may be circular or other shapes. The closed-loop groove 21 may be formed by the main body 12B and the cable holder 20 together.

In the illustrated embodiment, the closed-loop groove 21 includes a first portion 2A, two opposite second portions 2B, and a third portion 2C. The first portion 2A of the closed-loop groove 21 is formed in main body 12B. The two opposite second portions 2B of the closed-loop groove 21 are formed in the cable holder 20. The third portion 2C of the closed-loop groove 21 is formed between the main body 12B and the cable holder 20.

FIGS. 6 to 10 illustrate an electric connecting structure 40 according to a second embodiment of the present disclosure. In this embodiment, the electric connecting structure 40 is a cable connector, can be used in various applications, for transmitting a source power and/or a control signal to an electrical device (not shown). The electrical device may be an electric motor, in particular a brushless motor applied in a fan unit for a heat exchanger of an automobile.

Figure 6:
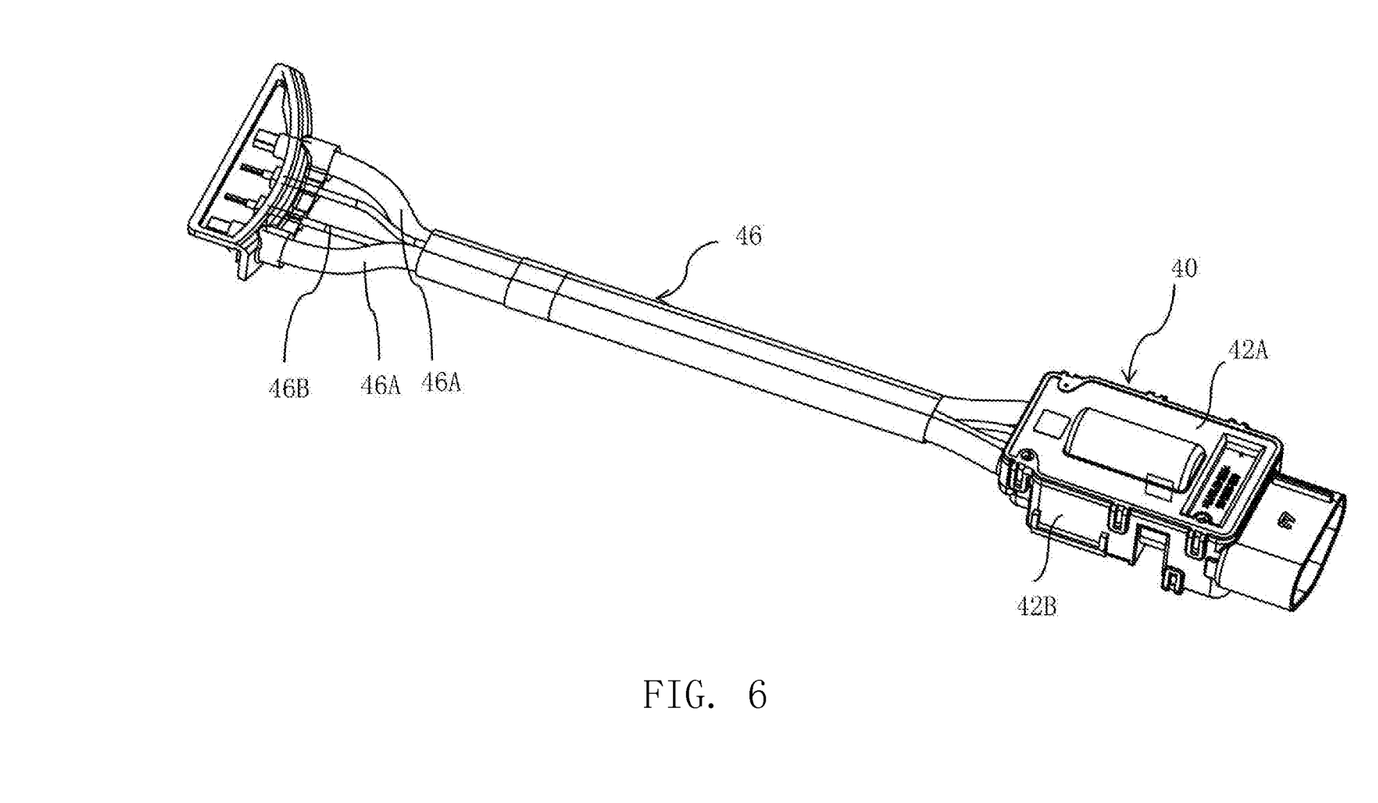
FIG. 6 illustrates an application of an electric connecting structure according to a second embodiment of the present disclosure.
Figure 7:
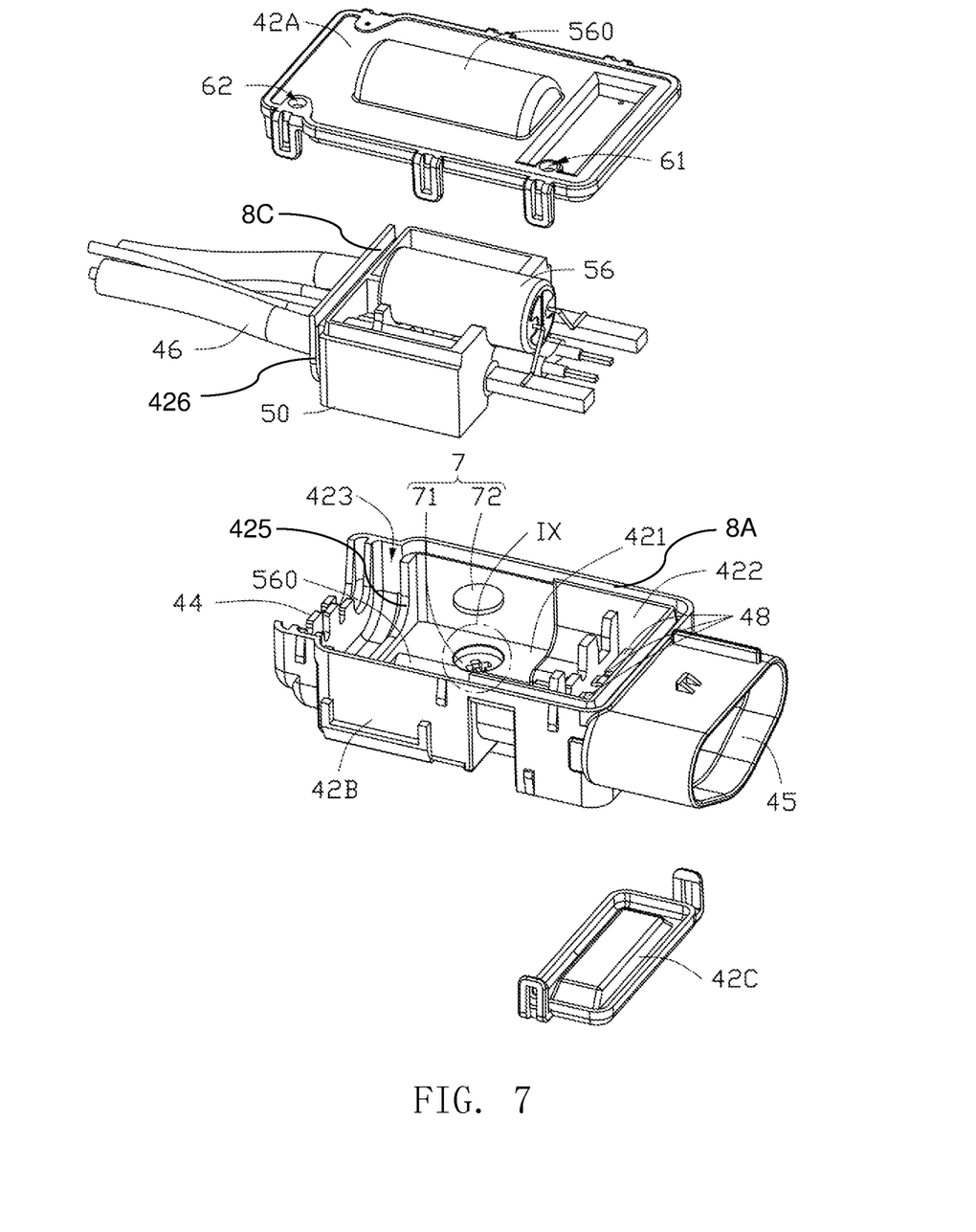
FIG. 7 is a exploded view of the electric connecting structure of FIG. 6.

The electric connecting structure 40 includes at least two cables 46, a cable holder 50 integral with the at least two cables 46, at least one electronic component 56, an outer casing (not labelled) with a first opening 44, a second opening 45, and at least two electrical connection terminals 48. The cable holder 50 is arranged in the outer casing (not labelled). The coupling operation between the cable holder 50 and the outer casing (not labelled) can be carried out after the molded material of the cable holder 50 is solidified.

Each cable 46 passes through the first opening 44 and has an end (not labelled) arranged in the outer casing (not labelled). A first end (not labelled) of the electrical connection terminal 48 is connected with the corresponding cable 46, and a second end (not labelled) of the electrical connection terminal 48 is located in the second opening 45 to engage with a corresponding connector. Preferably, the electrical connection terminals 48 are integral with the outer casing (not labelled).

The electronic component 56 may be a filter element, preferably a capacitor. The electronic component 56 is connected between the cables 46, and arranged in the outer casing (not labelled). The electrical connection between the electronic component 56 and the cable 46 is preferably, but no limited to electric resistance welding, also can use other known methods such as seaming, brazing or soft-soldering.

Figure 8:
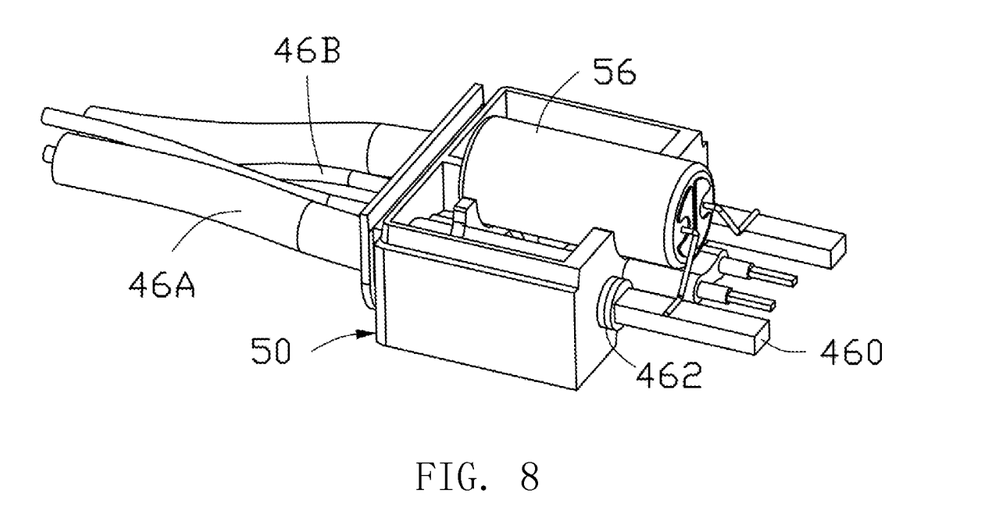
FIG. 8 is an enlarged view of a cable holder of the electric connecting structure of FIG. 7.

The cable holder 50 is molded onto the cables 46. Preferably, the cable holder 50 is designed as an injection-molded component and directly molded on the cables 46 with a plastic material, so that the cables 46 are held by the cable holder 50 to prevent the cable holder 50 from moving along the cables 46. Preferably, the cable holder 50 is substantially a rectangular frame, and each cable 46 crosses the cable holder 50 with one end arranged outside the cable holder 50 to connect the corresponding electrical connection terminals 48.

The electric connecting structure 40 includes the cable holder 50, so there is no need to position the cables and the electrical connection terminals, respectively, and thus the wiring operations is simplified.

In the illustrated embodiment, the cables 46 includes two power cables 46A for transmitting power source, and two signal cables 46B for transmitting a control signal. Correspondingly, the electrical connection terminals 48 includes two power terminals 48A and two signal terminals 48B. It should be understood that the number of the signal cables 46B can be only one or more than two, and the number of the signal terminals 48B also can be only one or more than two. The at least one electronic component 56 includes two capacitors, each of which is connected between the two power cables 46A. The two capacitors 56 are respectively disposed at two opposite sides of the cable holder 50. It should be understood that the number of the capacitors 56 also can be only one or more than two.

In the illustrated embodiment, each power cable 46A includes a conductor 460 and a sheath 462. Each capacitor 56 has two pins (not labelled), each of which is connected to the end of the corresponding power cable 46 which is located outside the cable holder 50. The connection is established through removing at least a part of the sheath 462 at the end of the power cable 46. The pin of the capacitor 56 is connected to the end uncovered by the sheath 462, preferably through electric resistance welding. The conductor 460 includes a plurality of compacted copper wires with a rectangular cross-section, which can facilitate electric resistance welding.

In the illustrated embodiment, the outer casing (not labelled) includes a main lid 42A and a main body 42B coupled together through an interlocking closure structure (not labelled). Alternative closure structure also can be used, such as a screwing closure structure.

Figure 10:
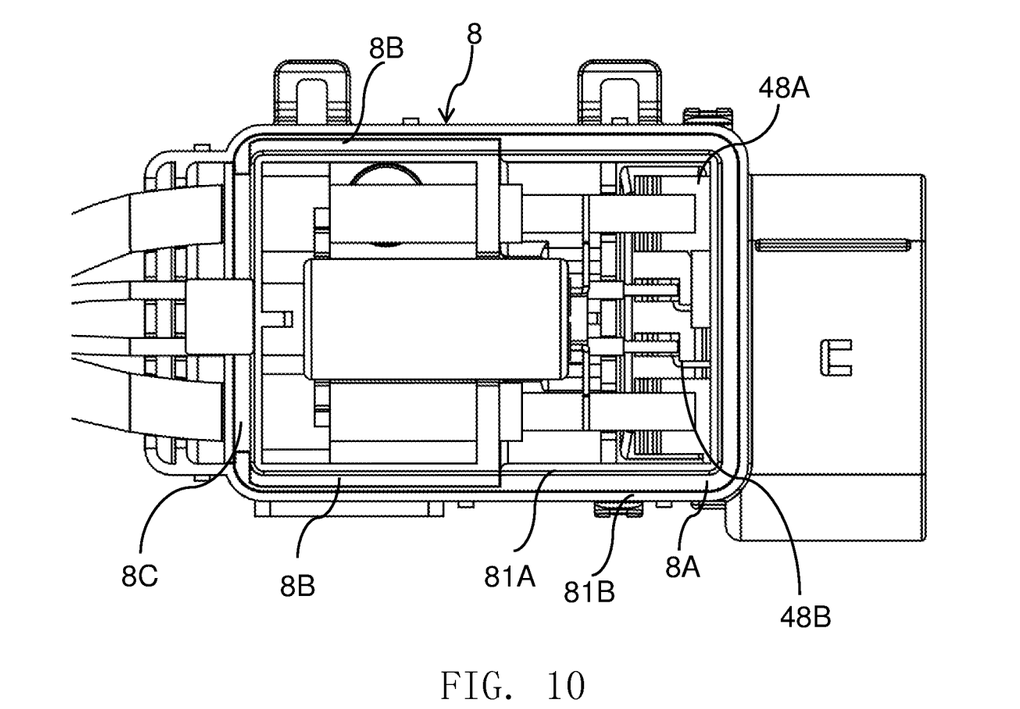
FIG. 10 illustrates the electric connecting structure of FIG. 6, with a main lid thereof removed.

Preferably, the main body 42B includes a first accommodation 421 and a second accommodation 422 along an extension direction of the cables 46. The cable holder 50 and the two capacitors 56 are arranged in the first accommodation 421. The cables 46 pass through the first accommodation 421 and extend into the second accommodation 422. The first end of the electrical connection terminals 48 are arranged in the second accommodation 422 to connect the cables 46.

Preferably, the first accommodation 421 has a bottom (not labelled). The second accommodation 422 is a through opening which passes through the main body 42B along a direction perpendicular to the extension direction of the cables 46, so that both sides of the main body 42B is operatable, which is convenient for electric resistance welding the ends of the cables 46 to the electrical connection terminals 48.

Figure 11:
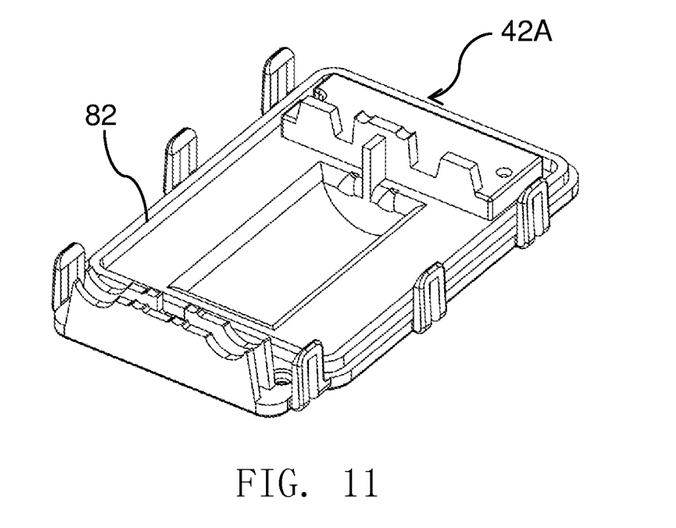
FIG. 11 illustrates the main lid of the electric connecting structure of FIG. 7 from an opposite view.

The main lid 42A is coupled to one side of the main body 42B to cover the first accommodation 421 and the through opening. Preferably, the main lid 42A further includes a first injection hole 61 facing the second accommodation 422, for injecting resin to protect the connection between the cables 46 and the electrical connection terminals 48 and seal the second accommodation 422. The outer casing 42 further includes a secondary lid 42C. The secondary lid 42C is coupled to the other side of the main body 42B to cover the through opening.

One of the capacitors 56 is arranged between the bottom of the first accommodation 421 and the bottom side of the cable holder 50. Another one of the capacitors is arranged between the top side of the cable holder 50 and the main lid 42A. In the illustrated embodiment, the capacitors 56 are cylindrical. Both the bottom of the first accommodation 421 and the bottom side of the cable holder 50 have a recess 560 to respectively accommodate a part of one capacitor 56. Both the bottom of the top side of the cable holder 50 and the main lid 42A have a recess 560 to respectively accommodate a part of the other capacitor 56. Preferably, the shape of the recesses 560 match the shape of the capacitors 56.

Figure 9:
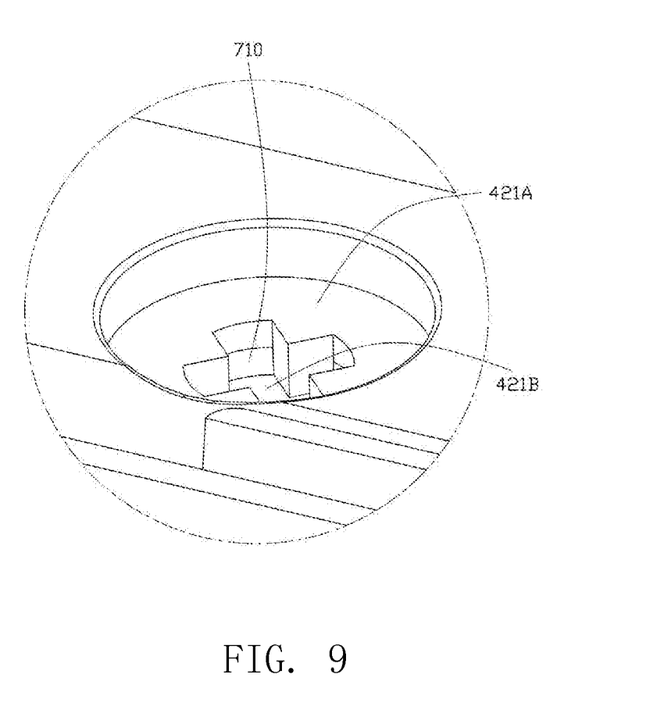
FIG. 9 is an enlarged view of the portion IX of the electric connecting structure of FIG. 7.

Preferably, the bottom of the first accommodation 421 accommodating the capacitors 56 further includes a pressure equalization valve 7 to compensate the pressure variation of the first accommodation 421. The pressure equalization valve 7 includes at least one breathing hole 710, from which the external air can enter or exit, and a water-impermeable membrane 72. The membrane 72 is a microporous membrane, e.g. one made of polytetrafluoroethylene, such as a Gore-Tex™ membrane, which is permeable to air but watertight. The breathing hole 710 may be integrally formed in the bottom of the first accommodation 421, or formed in a separate element which is assembled to the bottom of the first accommodation 421 via a through hole. The membrane 72 is fixed, preferably welded to the bottom of the first accommodation 421 and corresponding to the breathing hole 710. In alternative embodiment, the pressure equalization valve 7 also can be disposed on the main lid 42A.

In the illustrated embodiment, a first notch 421A is formed by recessing inwardly from the bottom of the first accommodation 421. The membrane 72 is welded into the first notch 421A. The partial first notch 421A continues to recess inwardly to form a second notch 421B. The side surface of the second notch 421B has a plurality of breathing holes 710 perpendicular to the bottom of the first notch 421A.

Preferably, the main body 42B further includes a third accommodation 423 located between the cable holder 50 and the first opening 44, to accommodate a portion of the cables 46 outside the cable holder 50. The main lid 42A coupled to the main body 42B further covers the third accommodation 423 and has a second injection hole 62 corresponding to the third accommodation 423, for injecting resin to seal the third accommodation 423.

The cable holder 50 may be mounted and positioned in the main body 42B through sliding or interlocking. In the embodiment, The main body 42B includes at least one guide rail 425 perpendicular to the extension direction of the cables 46. The cable holder 50 includes at least one corresponding guide groove 426 configured to engage with the at least one guide rail 425, so the cable holder 50 is slidably mounted and positioned in main body 42B. Preferably, the first accommodation 421 of the main body 42B includes a positioning groove matching with the shape of the cable holder 50, for further locating the cable holder 50. Once the cable holder 50 is mounted to the main body 42B, the ends of the cables 46 can be automatically aligned with and placed above the corresponding electrical connection terminals 48, preferably in contact with the electrical connection terminal 48.

Preferably, a closed-loop groove 8 is formed on the side of the assembled main body 42B and the cable holder 50 adjacent to the main lid 42A. The closed-loop groove 8 is a continuous closed groove surrounding the capacitors 56 and an electrical connection area of the electrical connection terminals 48 and the cables 46, for dispensing resin. Preferably, the closed-loop groove 8 includes an inner boundary wall 81A and an outer boundary wall 81B to close the groove 8, to prevent the resin from flowing out of the groove 8. The main lid 42A includes a closed-loop projection 82 configured to be engaged with the closed-loop groove 8, so as to realize a reliable sealing of the electric connecting structure 40 in an assembled condition. In alternative embodiments, the closed-loop groove 8 also may be formed in the main lid 42A, correspondingly, the closed-loop projection 82 may be formed on the at least one of the main body 42B and the cable holder 50.

The closed-loop groove 8 is preferably rectangular, also may be circular or other shapes. The closed-loop groove 8 may be formed by the main body 42B and the cable holder 50 together. In the illustrated embodiment, the closed-loop groove 8 includes a first portion 8A, two opposite second portions 8B, and a third portion 8C. The first portion 8A of the closed-loop groove 8 is formed in main body 42B. The two opposite second portions 8B of the closed-loop groove 8 are respectively formed between the main body 42B and the cable holder 50. The third portion 8C of the closed-loop groove 8 is formed in the cable holder 50.

The present disclosure also provides a manufacturing method of the electric connecting structure 10 of the first embodiment, which includes the steps of:

a. providing at least two cables 16, comprising two power cables 16A;

b. forming a cable holder 20 integral with the two power cables 16A by injection molding; and c. connecting at least one electronic component 26 between the two power cables 16A and mounting the cable holder 20 into an outer casing 12.

In the step b, the cable holder 20 is preferably directly molded onto the cables 16 with a plastic material.

In the step c, the order of the step connecting at least one electronic component 26 between the two power cables 16A and the step mounting the cable holder 20 into an outer casing 12 is not limited.

Preferably, the outer casing 12 includes a main body 12B and a lid 12A. The step c includes mounting the cable holder 20 into the main body 12B and mounting a lid 12A to the assembled main body 12B and the cable holder 20.

Preferably, a closed-loop groove 21 is formed on the side of the assembled main body 12B and the cable holder 20 adjacent to the lid 12A. The closed-loop groove 21 is a continuous groove surrounding the electronic component 26 and an electrical connection area of the electronic component 26 and the cables 16. A closed-loop projection (not shown) is formed on the lid 12A, and configured to be engaged with the closed-loop groove 21. The step c further includes dispensing resin in the closed-loop groove 21 before mounting the lid 12A.

The present disclosure also provides a manufacturing method of the electric connecting structure 40 of the second embodiment, which includes the steps of:

a1. providing at least two cables 46, each of the cables 46 having an end;

b1. forming a cable holder 50 integral with the cables 46 by injection molding;

c1. connecting at least one electronic component 56 between the ends of the cables 46, mounting the cable holder 50 into an outer casing 42 with at least two electrical connection terminals 48 fixed therein, and connecting the ends of the cables and the corresponding electrical connection terminals 48.

In the step b1, the cable holder 50 is preferably directly molded onto the cables 46 with a plastic material.

In the step c1, the order of the above three steps is not limited.

Preferably, the outer casing 42 includes a main body 42B and a main lid 42A. In the step c1, mounting the cable holder 50 into the main body 42B. The method further includes a step d1: mounting a main lid 42A to the assembled main body 42B and the cable holder 50.

Preferably, a closed-loop groove 8 is formed on the side of the assembled main body 42B and the cable holder 50 adjacent to the main lid 42A. The closed-loop groove 8 is a continuous groove surrounding the electronic component 56 and an electrical connection area of the electrical connection terminals 48 and the cables 46. A closed-loop projection 82 is formed on the main lid 42A, and configured to be engaged with the closed-loop groove 8. The step dl further includes dispensing resin in the closed-loop groove 8 before mounting the main lid 42A.

Preferably, the main lid 12A includes a first injection hole 61 and a second injection hole 62. The first injection hole 61 is corresponding to the ends of the cables 46. The second injection hole 62 is corresponding to an area between the cable holder 50 and the first opening 44 of the main body 42B. The method further includes a step el: injecting resin from the two injection holes 61, 62 to seal the corresponding areas of the main body 42B, respectively.

The above descriptions are only preferred embodiments of the present disclosure, and are not to limit the present disclosure. Any changes, equivalents, modifications and the like, which are made within the spirit and principle of the present disclosure, shall fall within the protection scope of the present disclosure.

The invention claimed is:

1. An electric connecting structure, comprising:
an outer casing;
at least two electrical connection terminals supported by the outer casing;
at least two cables, each of which having an end connected to a corresponding electrical connection terminal; and
an electronic component;
wherein the electric connecting structure further comprises at least one cable holder molded onto the at least two cables, the at least one cable holder is mounted in the outer casing, and the electronic component is connected between the ends of the at least two cables, and
wherein the outer casing comprises a main lid and a main body coupled together, and the at least one cable holder is mounted to the main body;
the main body comprises a through opening corresponding to an electrical connection area of the at least two cables and the at least two electrical connection terminals; and
the outer casing further comprises a secondary lid which is coupled to a side of the main body opposite to the main lid to cover the through opening.

2. The electric connecting structure according to claim 1, wherein the at least one cable holder is designed as an injection-molded component and directly molded on the at least two cables.

3. The electric connecting structure according to claim 1, wherein the electric connecting structure is a cable connector configured to connect an electric motor of a fan unit for a heat exchanger of an automobile, for transmitting a power source or a control signal.

4. The electric connecting structure according to claim 1, wherein the component is a capacitor, the at least two cables comprises two power cables, and the electronic component is connected between the two power cables.

5. The electric connecting structure according to claim 1, further comprising a chamber to accommodate the electronic component, and wherein a first part of the chamber is formed in the outer casing, and a second part of the chamber is formed in the at least one cable holder.

6. The electric connecting structure according to claim 1, wherein the end of each cable protrudes to an outside of the cable holder and is housed inside the outer casing to connect the corresponding electrical connection terminal.

7. The electric connecting structure according to claim 1, wherein the electrical connection area of the at least two cables and the at least two electrical connection terminals is sealed by injecting resin.

8. The electric connecting structure according to claim 1, wherein each of the at least two cables comprises a plurality of compacted copper wires with a rectangular cross-section, for electric resistance welding to the corresponding electrical connection terminal or the electronic component.

9. The electric connecting structure according to claim 1, wherein a closed-loop groove or projection is formed on a side of the assembled main body and the at least one cable holder adjacent to the main lid, the closed-loop groove or projection continuously surrounds the electronic component and an electrical connection area of the at least two electrical connection terminals and the at least two cables, the main lid comprises a corresponding closed-loop projection or groove configured to be engaged with the closed-loop groove or projection, and a resin is dispensed in the closed-loop groove.

10. The electric connecting structure according to claim 9, wherein the closed-loop groove or projection are formed by the main body and the at least one cable holder together.

11. The electric connecting structure according to claim 1, wherein a bottom of the main body further comprises a pressure equalization valve to compensate a pressure variation inside the outer casing.

12. The electric connecting structure according to claim 11, wherein the pressure equalization valve comprises at least one breathing hole for external air entry or exit, and a water-impermeable membrane fixed to the bottom of the main body and corresponding to the at least one breathing hole.

13. A manufacturing method for an electric connecting structure, comprising:
providing at least two cables, each of which having an end;
forming at least one cable holder integral with the at least two cables by injection molding;
connecting an electronic component between the ends of the at least two cables, mounting the at least one cable holder to a main body of an outer casing with at least two electrical connection terminals, and connecting the ends of the at least two cables and corresponding electrical connection terminals, the main body having a through opening corresponding to an electrical connection area of the at least two cables and the at least two electrical connection terminals; and
mounting a main lid and a secondary lid to opposite sides of the main body, the secondary main lid being corresponding to the through opening.

14. An electric connecting structure, comprising:
an outer casing, comprising two opposite sides;
at least two cables comprising two power cables; and
an electronic component arranged inside the outer casing;
wherein the electric connecting structure further comprises at least one cable holder at least molded onto the two power cables and mounted in the outer casing,
each of the two power cables passes through the two opposite sides in turn,
the electronic component is connected between the two power cables, and
the outer casing comprises a lid and a main body coupled together, and the at least one cable holder is mounted in the main body.

15. The electric connecting structure according to claim 14, wherein the outer casing further comprises a chamber for accommodating the electronic component.

16. The electric connecting structure according to claim 14, wherein a closed-loop groove or projection is formed on a side of the assembled main body and the at least one cable holder adjacent to the lid, the closed-loop groove or projection continuously surrounds the electronic component and an electrical connection area of the electronic component and the at least two cables, the lid further comprises a closed-loop projection or groove configured to be engaged with the closed-loop groove or projection, and a resin is dispensed in the closed-loop groove.

17. The electric connecting structure according to claim 14, wherein the at least one cable holder comprises at least one slot, and the electronic component is connected between the power cables via the at least one slot.

18. The electric connecting structure according to claim 17, wherein the at least one slot is sealed by injecting resin.

19. The electric connecting structure according to claim 14, wherein each of the power cables comprises a conductor and a sheath, and the electronic component is connected to the conductor by removing a part of the sheath without cutting off the conductor.

20. The electric connecting structure according to claim 19, wherein the conductor comprises a plurality of compacted copper wires with a rectangular cross-section, for electric resistance welding to the electronic component.

* * * * *